Sept. 9, 1969  C. L. CONKLIN, JR., ET AL  3,465,648
MULTIPLE OUTPUT FLUID CONTROL SYSTEM
Filed June 28, 1967  4 Sheets-Sheet 1

INVENTORS
CLEMENT L. CONKLIN, JR.
THOMAS M. HOLLAND, JR.

BY Julian L. Renfro
ATTORNEY

Sept. 9, 1969  C. L. CONKLIN, JR., ET AL  3,465,648
MULTIPLE OUTPUT FLUID CONTROL SYSTEM
Filed June 28, 1967  4 Sheets-Sheet 2

INVENTORS
CLEMENT L. CONKLIN, JR.
THOMAS M. HOLLAND, JR.

BY *Julian L. Renfro*
ATTORNEY

ALL UNITS ARE
PERCENT OF MAXIMUM

INVENTORS
CLEMENT L. CONKLIN, JR.
THOMAS M. HOLLAND, JR.

BY *Julian L. Renfro*

ATTORNEY

Sept. 9, 1969  C. L. CONKLIN, JR., ET AL  3,465,648

MULTIPLE OUTPUT FLUID CONTROL SYSTEM

Filed June 28, 1967  4 Sheets-Sheet 4

INVENTORS
CLEMENT L. CONKLIN, JR.
THOMAS M. HOLLAND, JR.

BY *Julian C. Renfro*

ATTORNEY

United States Patent Office 3,465,648
Patented Sept. 9, 1969

3,465,648
MULTIPLE OUTPUT FLUID CONTROL SYSTEM
Clement L. Conklin, Jr., and Thomas M. Holland, Jr., Orlando, Fla., assignors to Martin Marietta, New York, N.Y., a corporation of Maryland
Filed June 28, 1967, Ser. No. 649,681
Int. Cl. F15b *13/02, 15/17;* F01b *7/18*
U.S. Cl. 91—413        6 Claims

ABSTRACT OF THE DISCLOSURE

This invention teaches a multiple output actuator usable with fluid control systems, in which the piston of the actuator is provided with a multiplicity of different areas against which fluid pressure can be selectively admitted, so that a force of equal magnitude can be delivered in either direction of piston travel. Advantageously, at least one of the piston areas can be biased on occasion to a pressure different than the pressure to which certain related areas of the piston are biased, thus to bring about on such occasion a lower force output, which output can of course represent higher speed and a higher stroke then was possible at the time the full force was being delivered. Such an actuator is highly desirable for missile work inasmuch as this teaching enables smaller, lighter actuators or reduced power requirements to be used in the missile than was otherwise possible, yet still be effective to handle all of the requirements of an effective actuator in the missile.

---

This invention relates to a fluid control system required to operate over a broad range of force and velocity outputs, and more particularly to such a system that is compact and which by area biasing can trade off force and velocity at will, so that for a constant fluid power supply, a higher speed output or increased amount of output motion can be obtained, or, for a constant output force and velocity, a reduced fluid power supply can be employed.

In the past, a number of fluid control systems have been proposed, in which fluid actuators of various sizes are utilized, with such devices being arranged to operate at any of a number of operating rates. In missile work in particular, there are often conflicting requirements, for an actuator sized to handle the maximum force requirements often proves too slow at altitude, where the dynamic pressure and force requirements are low, and where greater speed of response, or greater amount of output motion is required. If a multiple output actuator is employed such that speed of response can be increased at low dynamic pressure, the system power requirement can be significantly reduced, making possible a lighter and smaller system than is otherwise possible. However, prior art dual output actuators have utilized arrangements which made them of necessity large, cumbersome and complicated.

In accordance with this invention, we provide a variable output, double acting fluid actuator comprising a multi-landed piston closely fitted in a cylinder, thereby to define a plurality of different areas upon which the fluid pressure can act. Means are provided for selectively applying fluid pressure to act against these areas, so that the piston can be caused to move to a desired extent in either direction in the cylinder. One of the areas of the piston represents the largest area acted upon by such fluid pressure, which area is substantially equal to and balanced by the total of the other areas on the piston that are subjected to fluid pressure. Such other areas include a biasing area, with means being provided in accordance with this invention for controlling the pressurization of such biasing area, so that the actuator can be operated in a low force, high speed regime, or a high force, low speed regime.

While in a preferred embodiment, such biasing area is one of two areas utilized to balance the largest area of the piston, it is within the scope of our invention to use an actuator in which the biasing area is one of more than two areas utilized to balance the largest area.

Although as previously mentioned other multiple force output actuators have been suggested in the past, in no known instance was an actuator provided so as to have equal gain or force outut in both directions, as well as minimum length and weight.

It is therefore a principal object of our invention to provide an actuator of compact size that can be selectively adjusted between conditions of high force, low speed operation, and high speed, low force operation, such being accomplished in a device that can provide the desired output in either direction of piston travel.

Other objects, features and advantages of this invention will be made more apparent from a study of the enclosed drawings in which.

Figure 1:
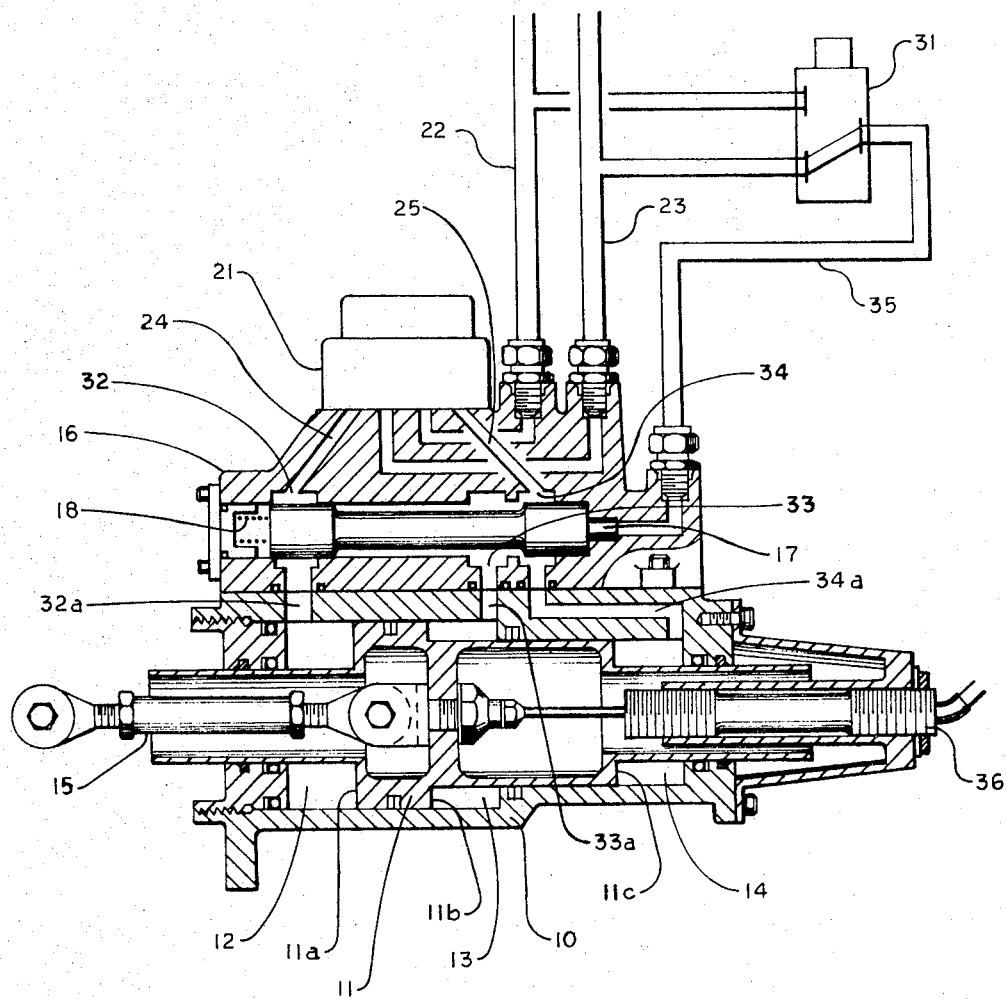
FIGURE 1 is a view, partly in section, of a preferred embodiment of our actuator in which the middle or biasing area of the piston is subjected to the same pressure as the area at the right hand end of the piston, thus providing a high force output in either direction of motion.
Figure 5:
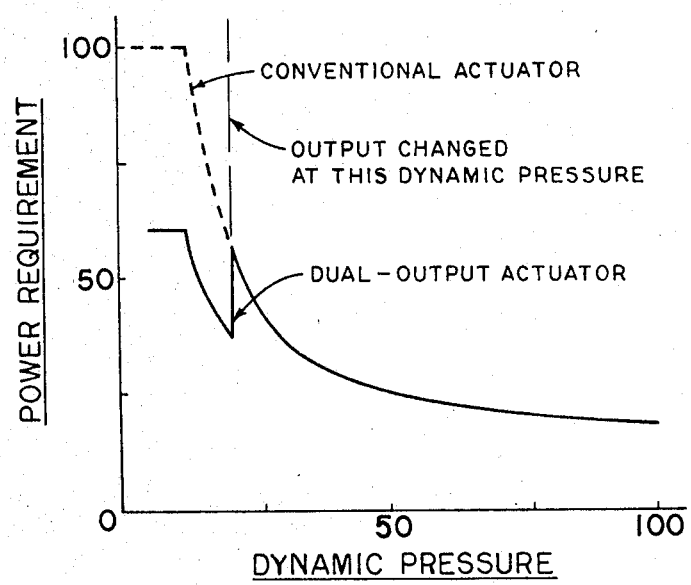
Figure 6:
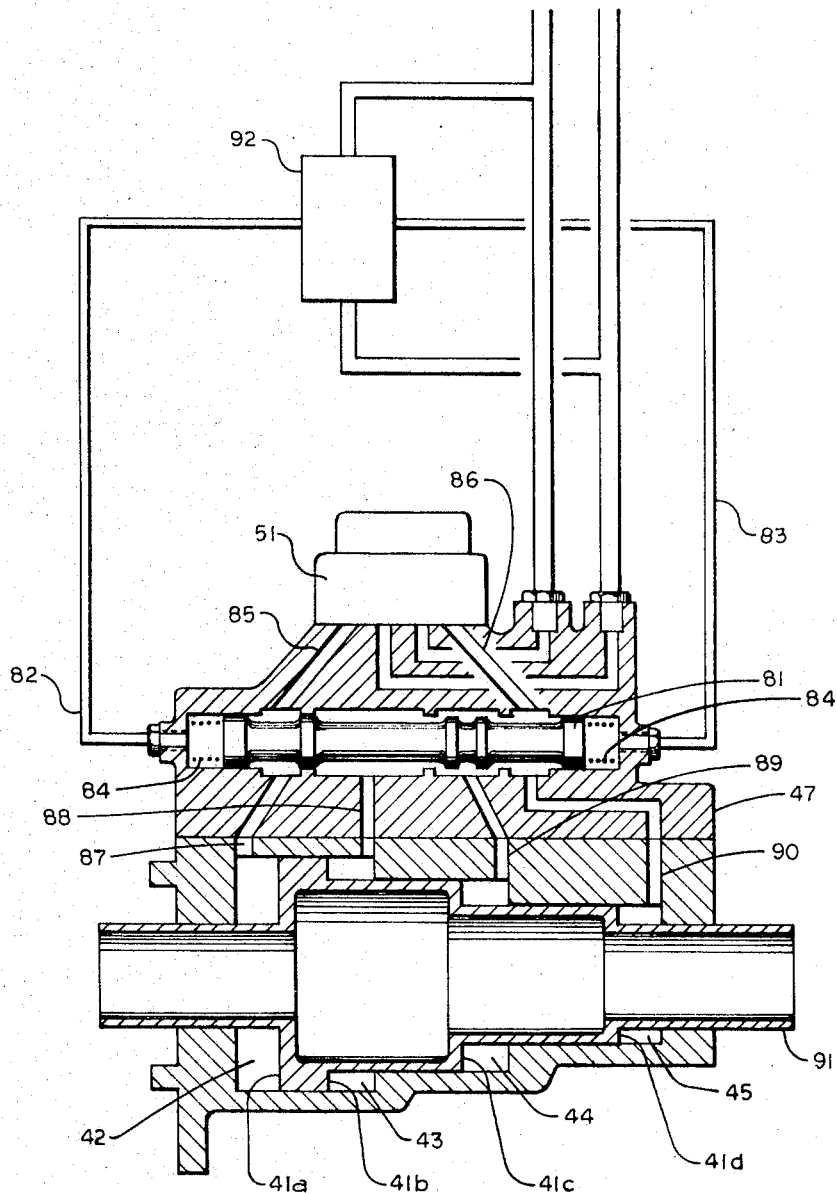

FIGURE 5 is a graph in which the control system power requirement is plotted versus dynamic pressure, this figure illustrating the power reduction available with our invention, obtained by area biasing to reduce the force output at low dynamic pressure as shown in FIGURE 1, and FIGURE 6 is a view of an embodiment in accordance with our invention in which more than two different outputs may be obtained.

Referring to FIGURE 1 is will be noted that the housing 10 of our variable output actuator is provided with a multi-landed piston 11 slidably mounted therein, in which housing, various chambers are defined, to which fluid pressure may be selectively admitted. By virtue of the arrangement described hereinafter, the piston can be caused to move either to the left or to the right as viewed in FIGURE 1, such being brought about by the appropriate application of fluid pressure against certain areas of the piston. The largest area 11a of the piston 11 in accordance with this embodiment is arranged to be subjected to the pressures manifested in chamber 12, with smaller area 11b of the piston being arranged to be subjected to pressure existing in chamber 13, and smaller area 11c being arranged to be subjected to pressure existing in chamber 14, near the right hand end of the housing. By design, area 11a is substantially equal to areas 11b and 11c considered together, so that by controlling the pressure existing at any one moment in chamber 12 with respect to the pressures in chamber 13 and chamber 14, the piston can be moved in the desired direction under a full force condition. A connecting rod assembly 15 is attached to the piston 11 so that the power output of the device may be directed to moving a control surface or the like in the case of a missile, or to any of a variety of devices not associated with missiles.

In accordance with this invention, a biasing area is defined, so that by selectively controlling or switching the fluid pressure acting against such area of the piston, the actuator may be operated either in a high force, low speed regime, or a low force, high speer regime. In the present embodiment, the piston area 11b represents the biasing area, which is of course pressurized to the desired extent by controlling the pressure in chamber 13. If this chamber is pressurized to the same extent as chamber 14, the piston can be moved either left or right in a high force regime, in which area 11a essentially balances areas 11b and 11c. However, if chamber 13 is pressurized to the same extent as chamber 12, a portion of piston area 11a is in effect nullified, leaving an area that is balanced by piston area 11c. At this time, the actuator is operable in either direction in a low force, high speed regime, in which an increased amount of output motion, or a higher speed output, can be obtained, or for a constant actuator output, a reduced fluid power supply may be employed.

A shuttle valve 16 is provided atop the housing 10 in which shuttle valve spool 17 is slidably disposed. This spool is normally biased to the right as viewed in FIGURE 1, by means of small compression spring 18. However, the right hand end of spool 17 resides in a chamber 19 (best seen in FIGURE 2) to which chamber, fluid pressure be selectively provided, so as to cause the spool to move on occasion to the left hand position illustrated in FIGURE 2, so that area switching in accordance with this invention may be accomplished. Spool 17 is landed, and when in the right hand position shown in FIGURE 1, the pressure in shuttle valve chamber 34 is also manifested in chamber 33, whereas chamber 32 is isolated from the other two chambers by the spool land at the left hand end of spool 17. However, when the spool is in the left hand position shown in FIGURE 2, the pressure in chamber 32 is manifested in chamber 33, and chamber 34 is the one isolated, this being by the land at the right hand end of the spool. Shuttle valve chambers 32, 33 and 34 are connected by means of passages 32a, 33a and 34a to chambers 12, 13 and 14, respectively.

Transfer valve 21 is provided atop shuttle valve 16, this device being a conventional electro-hydraulic servo valve. As noted in these figures, fluid lines 22 and 23 are connected to the transfer valve so as to furnish both system pressure as well as system return pressure, respectively. By operation of this valve, modulated pressure may be applied to the various actuator areas, as will be seen hereinafter. Control lines 24 and 25 are provided in conjunction with the transfer valve, which lines connect to chambers 32 and 34, respectively, of the shuttle valve.

When the spool 17 is in a right hand position as shown in FIGURE 1, upon fluid pressure being directed through control line 25 to chamber 34, such pressure is also manifested in chamber 33, but is blocked from chamber 32 by the spool land at the left end of the spool. In such position, system pressure as modulated by the transfer valve 21 can of course be asserted in both chambers 13 and 14 by virtue of passages 33a and 34a, thus giving full force operation of the piston to the left, for example. Fluid displaced from chamber 12 is returned through passage 24 in this instance. Upon the transfer valve being energized to its opposite position, modulated system pressure is applied through passage 24 to chamber 32, which of course causes a similar pressure to flow through passage 32a, and be asserted in chamber 12 so that it can move the piston 11 to the right under full force conditions. Fluid displaced from chambers 13 and 14 is returned through passage 25.

Figure 2:
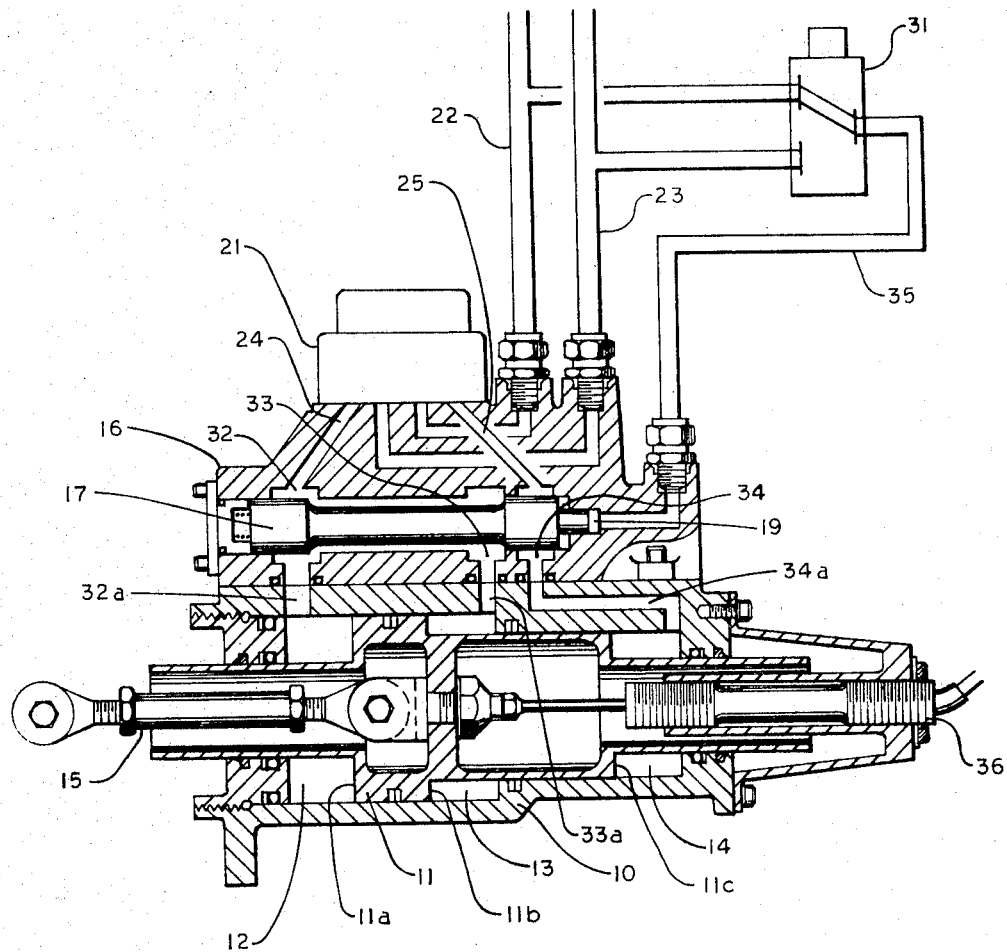
FIGURE 2 is a sectional view similar to FIGURE 1, but in which the middle or biasing area of the piston is subjected to the same pressure as that to which the left hand end of the piston is subjected, thus in effect decreasing the effective area of the piston so that it can be moved by system pressure at a very high rate of speed, or in a reduced flow condition.

Upon the spool 17 being moved to the left hand position as shown in FIGURE 2, which is brought about by operation of selector valve 31 causing system pressure present in line 22 to flow through line 35 and be asserted in chamber 19, the right hand land of the spool prevents communication between chambers 34 and 33, and at the same time the left hand land moves to open up communication between chambers 32 and 33. In this circumstance, upon modulated pressure from control line 25 being applied to shuttle valve chamber 34, and to piston chamber 14, such pressure acts against area 11c and causes piston 11 to move to the left. At this time, pressure in control line 24 is asserted in both chambers 12 and 13, with the pressure acting against area 11b in effect negating or nullifying a portion of the area 11a of the piston, providing reduced force output and reduced actuator flow requirement. It should be noted in this instance that fluid displaced from chamber 12 divides, and flows both through the transfer valve, as well as past the non-landed portion of spool 17 into chamber 13. Thus the system flow requirement in this operating regime, for a given velocity, is reduced by the proportion of area 11b to 11a.

The same basic conditions hold true when the piston 11 is to be moved to the right, for although modulated fluid pressure admitted through feed line 24 is applied to area 11a, it is also applied to area 11b, which brings about a diminishment of the effectiveness of the pressure acting in chamber 12. Hence motion to the right under reduced force output is obtained, with attendant reduced flow requirement. The fluid displaced from chamber 14 flows through passage 34a and chamber 34, and is returned through passage 25.

As an example, the supply pressure in line may be 3000 p.s.i., and the return line pressure in line 23 may be 100 p.s.i. If a controlled-loop operation of the actuator is desired, a feedback device 36 may be employed on the opposite end of the piston from the connecting rod 15.

It should be noted that actuator areas are sized by the high dynamic pressure requirements, such as are found at low altitudes, but the fluid power supply input is sized by the combination of actuator area, and the velocity or stroke (deflection) requirements, which are often critical at higher altitudes. Hence, in a conventional actuator, the maximum power requirements are obtained from driving an essentially oversized actuator to the force output required at low dynamic pressure.

In contrast, in accordance with the present invention, it is possible to reduce the effective actuator area at will to meet the reduced force required, hence decreasing the power supply output requirement, and/or obtaining the desired higher speed, or increased stroke.

Although we have described our novel actuator in terms of usage with a missile control system, it is obvious that it could be advantageously used with the rapid traverse mechanism of a machine tool, or a variety of other usages.

It should be noted that while we prefer to use an electrohydraulic servo-valve 21 for modulating pressure and flow to the respective areas of piston 11, it is within the scope of our invention to use a simple on-off or relay type valve if such be desired for economy or other such reasons. Also, the biasing area may be disposed at one end of the piston if desired, rather than being limited to the central area 11b as shown in this embodiment.

Figure 3:
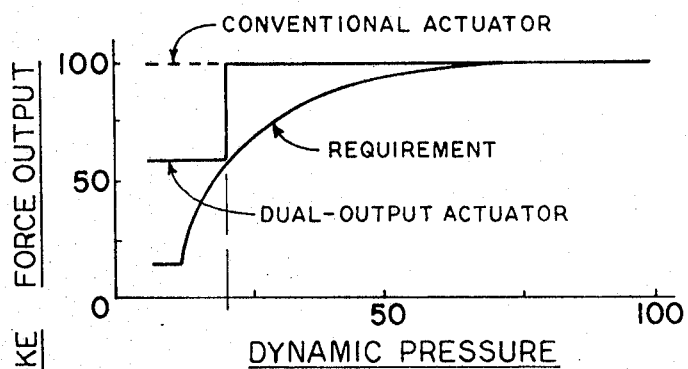
FIGURE 3 is a graph of force output requirement plotted versus dynamic pressure for a typical missile flight regime.
Figure 4:
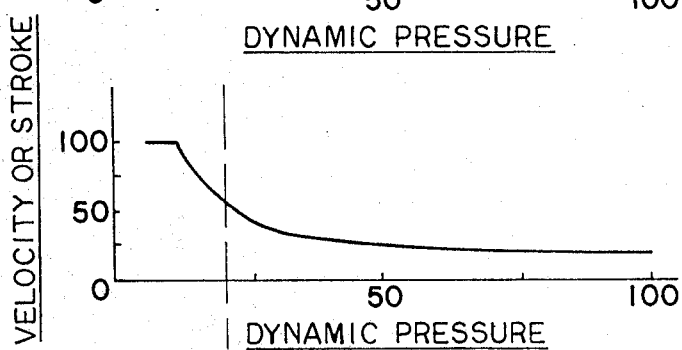
FIGURE 4 is a graph somewhat similar to FIGURE 3 in which control surface velocity is plotted versus dynamic pressure for a typical missile flight regime.

FIGURE 3 depicts the actuator force output typically required in high performance aircraft and missiles which are required to operate over a wide range of speed and altitude. It can be seen that the required actuator force increases rapidly as the dynamic pressure imposed on the vehicle increases. Such high dynamic pressure is normally encountered in low altitude, high speed flight, whereas the dynamic pressure decreases at higher altitudes. The control surface velocity required over the complete flight regime may be constant, or in the worst case may actually increase to maintain sufficient vehicle control during flight at the lower dynamic pressures, as shown in FIGURE 4.

Referring again to FIGURE 3 it can be seen that, since the actuator must be designed to provide the maximum force requirement, the conventional actuator is seriously oversized during operation at the low dynamic pressure conditions. If, however, a multiple-output actuator in accordance with this invention is employed, the effective actuator force output capability can be decreased to more closely match the requirement. A dual output case is chosen for simplicity of presentation.

Since the combination of actuator force (or area) and velocity represent the power required for the actuator, the power which must be made available for the conventional actuator increases rapidly with decreasing dynamic pressure, as shown in FIGURE 5. However, since the dual-output actuator force may be reduced to more closely match the required force at low dynamic pressure, the power required for the dual-output actuator is considerably reduced, and as such represents a significant reduction in the control system size and weight.

Turning to FIGURE 6 it is to be seen that within the spirit of our invention we can utilize a multiplicity of piston areas, so as to further optimize the force/velocity relationships of this device, while still maintaining the substantially equal force outputs in both directions of piston travel. In this embodiment, area 41a can be selectively balanced by areas 41b through 41d, one or more of which may be regarded as biasing areas. More particularly, the chamber 42 associated with area 41a can be exposed to one output of transfer valve 51, and the chamber 45 associated with area 41d, for example, can be exposed to the other output of servo valve 51. Significantly, the pressures in chambers 43 and 44 associated with areas 41b and 41c can be selectively ported either singly or in concert, to one or the other of the transfer valve outputs. In this manner, it can be seen that we have provided a three step actuator output variation. Even more steps within the spirit of our invention could be provided if desired.

In the embodiment shown in FIGURE 6, the shuttle valve 47 contains a landed spool 81 which in the absence of supply pressure applied to the control lines, 82 and 83, is held in the centered position shown by means of centering springs 84 or a detent (not shown). In this condition modulated pressure from the transfer valve 51 is applied through lines 85 and 87 to chamber 42 and through line 86, 88, 89 and 90 to chambers 43, 44 and 45. In this condition, full maximum actuator output is applied to piston 91 in both directions of motion. If, however, control valve 92 is energized to provide system pressure in line 83, and system return pressure in line 82, the spool 81 will move to the left. In this condition both chambers 42 and 43 will be exposed to transfer valve modulated pressure through line 85, and chambers 44 and 45 will be exposed to modulated pressure through line 86. Hence the actuator will operate in an intermediate force and speed condition. When the control valve 92 is energized to provide system pressure in line 82, and system return pressure to line 83, the spool 81 will move to the right. In this condition chambers 42, 43 and 44 are exposed to the transfer valve modulated pressure through line 85, and only chamber 45 will be exposed to the transfer valve pressure in line 86. Hence the actuator will operate in its lowest force and maximum speed condition.

As is therefore to be seen, by proper apportionment of the areas 41a through 41d, equal output in either direction of motion may be obtained in all three modes of operation. FIGURE 6 presents only one embodiment of the shuttle valve 47. Other constructions of shuttle valves, such as for example, the use of two pressure levels acting at one end of the spool, or the use of multiple spools, can be employed within the spirit of this invention.

As to overall constructional details, in the preferred embodiment shown in FIGURE 1, for example, conventional O-ring seals are noted to be used to seal the piston rod 11 at the external locations. Piston rings in the housing 10 and piston are used for sealing the internal chambers to provide minimum actuator length. The piston 11 may be constructed of steel, with the cylinder made of aluminum, although all aluminum or all steel construction may be employed, depending upon the requirements of the application. Similarly the shuttle valve body 16 and spool 17, while both preferably of aluminum, may be constructed of any of a number of materials. While the shuttle valve 16 is shown bolted to the cylinder body, with O-ring seals located at the passage interfaces between the shuttle valve and cylinder body, it is within the spirit of this invention to make the two an integral unit, thus eliminaing the interface seals and providing an even more compact device. The connecting rod 15 may be utilized to convert the piston translatory motion to oscillatory motion by means of a crank, but of course a linear output may be sufficient in some applications.

We claim:

1. A variable output, double acting fluid actuator having two different output regimes and functioning to provide equal force and velocity outputs in each regime in either direction of motion, comprising a multi-landed piston closely fitted in a cylinder, thereby to define a plurality of different areas upon which fluid pressure can act, means for selectively applying fluid pressure to act against said areas, so that said piston can be caused to move to a desired extent in either direction in said cylinder, one of the areas on said piston representing the largest area acted upon by such fluid pressure, which area is substantially equal to and balanced by the total of the other areas on said piston subjected to fluid pressure, said other areas including a biasing area, and means for controlling the pressurization of said biasing area, so that said actuator can be operated to provide power in either direction of motion, either in a low force, high speed regime, or a high force, low speed regime.

2. The variable output actuator as defined in claim 1 in which said biasing area is one of two areas utilized to balance said largest area.

3. The variable output actuator as defined in claim 1 in which said biasing area is one of more than two areas utilized to balance said largest area.

4. A variable output, double acting fluid actuator comprising a multi-landed piston slidably disposed in a cylinder, said lands being of different diameters, so that a plurality of different areas on said piston are defined, said cylinder having various inner diameter portions arranged to receive in closely fitting relation, the respective piston lands, thus defining a plurality of chambers to which fluid can be admitted so as to act upon certain areas of said piston, a plurality of fluid supply ports connected to said chambers for applying high pressure fluid to said certain piston areas on a selective basis, so that said piston can be caused to move to a desired extent in either direction in said cylinder, one end of said piston representing the largest area acted upon by such fluid, which area is substantially equal to and balanced by the total of the other areas on said piston subjected to fluid pressure, thus defining an equal force arrangement in either direction of motion, said other areas including a biasing area, and means for controlling the pressurization of said biasing area, said biasing area being caused to be subjected to the same fluid pressure as said largest area when said actuator is operating in its low force, high speed regime, and being subjected to the same fluid pressure as at least one of said other areas when said actuator is operating in its high force, low speed regime.

5. The variable output actuator as defined in claim 4 in which said biasing area is one of two areas utilized to balance said largest area.

6. The variable output actuator as defined in claim 4 in which said biasing area is one of more than two areas utilized to balance said largest area.

References Cited

UNITED STATES PATENTS 1,824,373 9/1931 Schmid _____ 92—152
2,575,982 11/1951 Stevens _____ 92—152
3,170,379 2/1965 Dempster.

FOREIGN PATENTS 51,182 3/1890 Germany.

PAUL E. MASLOUSKY, Primary Examiner

U.S. Cl. X.R.

91—415, 447, 461; 92—152